United States Patent Office 3,773,879
Patented Nov. 20, 1973

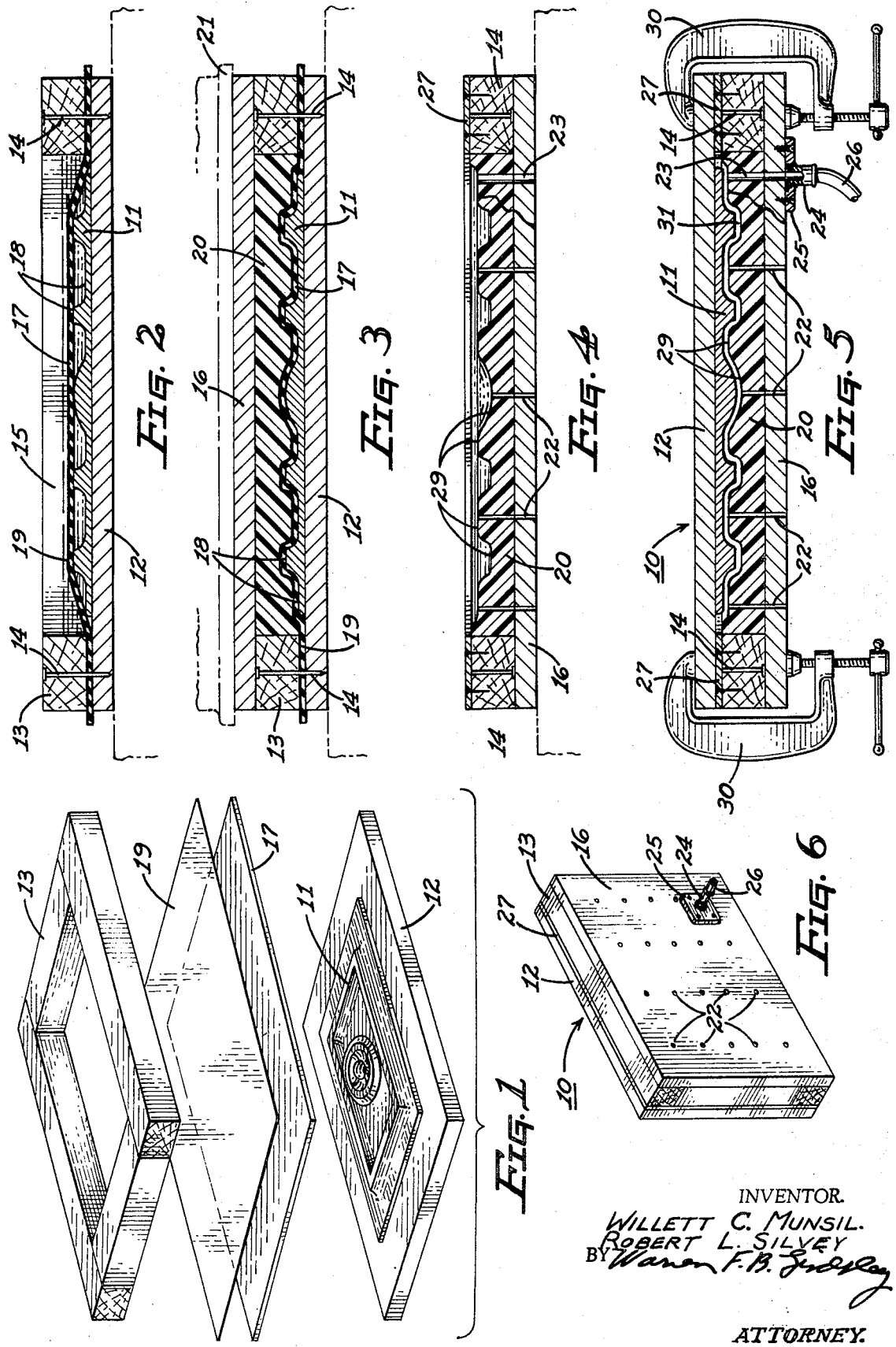

3,773,879
METHOD OF MAKING A CONTOUR MOLD
Willett C. Munsil, 3331 N. 10th Ave. 85013, and Robert L. Silvey, 126 W. Northview 85021, both of Phoenix, Ariz.
Filed Dec. 31, 1970, Ser. No. 103,054
Int. Cl. B29c 1/02; B29d 27/04
U.S. Cl. 264—54    6 Claims

ABSTRACT OF THE DISCLOSURE

A method of fabricating a glove type mold wherein a deformable sheet of uniform thickness is made to conform to a distinctive surface of an object while a hardenable material is caused to conform closely to the surface of the deformable sheet duplicating the distinctive surface of the object. After hardening of the material the sheet is stripped away from the hardened material and this material is then placed opposite but in a given spaced relationship to said distinctive surface of said object so both duplicate and object have distinctive surfaces facing each other. The spacing between the distinctive surfaces is then filled with mold material.

BACKGROUND OF THE INVENTION

This invention relates to molds and the fabrication of molds, and more particularly to the method of manufacturing contour type molds which accurately duplicate distinctive surfaces of irregularly or regularly shaped objects.

Field of the invention

This invention is directed to a mold and the method of making the same wherein gas expanded plastic is used in a confined area to duplicate distinctively shaped objects resulting in a reusable sheet or glove type mold of uniform thickness.

Description of the prior art

Heretofore molds for distinctively shaped objects have been expensive to manufacture since they required the use of excessive amounts of expensive material to form the mold into the likeness of the object being copied. In view of the high cost of mold material the prior art methods of copying are prohibitive especially where only one or a few copies of the article are needed.

SUMMARY OF THE INVENTION

In accordance with the invention claimed an improved mold assembly and method of making the same is provided which permits rapid, simple and inexpensive fabrication of distinctively shaped objects.

It is, therefore, one object of this invention to provide a new and improved mold and method of fabricating molds of distinctively shaped articles.

Another object of this invention is to provide an improved method of forming a thin glove type mold of uniform thickness of an irregularly shaped object or portions thereof.

A further object of this invention is to provide a new and improved method of forming a mold out of a gas expandable plastic compound.

A still further object of this invention is to provide a method of fabricating a mold of an irregularly shaped object which may be performed by relatively unskilled workers.

A still further object of this invention is to provide a method of fabricating a mold the thickness of which may be controlled.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which:

FIG. 1 is an isometric exploded view of the several parts of a mold apparatus used to carry out the invention method;

FIGS. 2–4 are cross-sectional views of various stages of fabrication of the molds according to the present method;

FIG. 5 is a cross-sectional view of the assembled mold; and

FIG. 6 is a perspective view of the mold assembly shown in FIG. 5.

DESCRIPTION OF PREFERRED EMBODIMENT

Referring more particularly to the drawing by characters of reference, FIGS. 1–5 disclose a mold assembly 10 and method of fabrication of a mold for a distinctively shaped object 11. It should be understood that the present invention is not limited to the particular mold assembly described herein but that other types of molds can be used to support the object being copied while embodying the claimed invention.

As shown in FIG. 1 the mold assembly 10 comprises a lower mold member 12 and an upper mold member 13 which are sized and shaped in accordance with the size and shape of the object to be manufactured. The lower mold member 12 is shown for purposes of illustration as merely being a supporting platform on which the article 11 is mounted while the upper mold member 13 is formed as a frame, hollow inside to receive a given thickness of plastic foam hereinafter described. The object 11 may be anything which is intended to be reproduced and is shown herein as being a panel or decorative plate for a door. The lower and upper mold members 12 and 13 are shown as being formed out of wood although metal such as aluminum which is light weight and easily fabricated may be used.

The upper mold member 13 when fastened to the lower mold member 12 by nails 14, for example, defines a partially confined zone 15 into which a suitable expansible plastic compound may be introduced. Mold member 13 has affixed thereto a cooperating cover member 16 which is brought into face contact with the upper surface of upper mold member 13 to define a confined border frame mold in which expansible plastic compound is introduced in unexpanded or reduced form to expand to the limits of confinement.

In order to achieve the fabrication of a glove type mold a sheet or stack of sheets 17 of suitable material is placed over the surface of object 11 intended to be duplicated. This sheet, which originally has flat upper and lower surfaces and a predetermined uniform thickness, is made of a material which is sufficiently deformable such as rubber to permit it to conform closely to the contour of surface 18 of object 11 when forced thereagainst by the application of any suitable force produced, for example, by means of liquid or gas under pressure. Yet, the sheet should be relatively incompressible so that it maintains its uniform thickness.

Next, there is applied, as shown in FIG. 1 over sheet 17 a thin sheet of material 19, for example, a suitable plastic of approximately 6 mils in thickness, which will not be affected by the expandable plastic intended to be injected into the mold assembly 10.

As shown in FIGS. 1–5, the object 11 to be duplicated is fastened to the lower mold member 12 and is usually arranged within the periphery of member 12 sufficiently to provide a border around the object. Then, the rubber sheet 17 is placed over object 11 and is of sufficient size to extend out to the edge of the lower mold member 12. The plastic sheet material 19 is then placed over the rubber sheet 17 and it also extends to the edge of lower mold member 12. At this time the upper mold member 13 is nailed or fastened to lower mold member 12 causing sheet 17 and plastic sheet material 19 to tightly hug the surface 18 of object 11.

There is then applied over the combination of object 11, rubber sheet 17 and plastic material 19 enough expandable plastic such as, for example, urethane foamable material 20 which will fill the smallest irregular configuration of the surface of object 11 and then expand so as to closely conform to the contour of the outer surface of object 11 deforming during this process the rubber sheet 17 and the plastic material 19.

In the practice of the invention enough urethane foam material is poured into the mold to result in approximately 24 lbs. pressure when cover member 16 is clamped on the mold assembly 10 so as to contain the expanding urethane which will force the rubber sheet against the pattern or object 11 in near matching configuration. It is usually desirable to leave the cover member 16 clamped to the lower and upper mold members 12 and 13 for one hour or any other time necessary for the urethane foam to have fully expanded and reached its rigid configuration.

FIG. 3 illustrates that a suitable force may be applied to the mold assembly 10 to contain the expanding urethane foam 20 to produce the desired results. In this instance a pressure element 21 of a press (not shown) may be used although any suitable clamps or weights may suffice.

As the urethane foam material hardens it forms a cast of the surfaces against which it bears.

The hardened urethane foam material 20 and mold cover member 16 to which it is secured is then separated from the lower mold member 12 and rubber sheet 17 and the sheet of plastic material 19. A suitable number of small vent holes 22 are then drilled through cover member 16 and the urethane foam material 20 together with a larger injection hole 23. The vent holes may be of the size that can be plugged by a toothpick and the larger injection hole 23 may be from 5/16 to 3/8 inch in diameter. As shown in FIG. 5 a pipe nipple 24 may be threadedly engaged with a flange plate 25 which in turn can be attached over the injection hole 23 as shown so as to readily receive a hose 26 for the injection of suitable mold material (not shown) into the void between object 11 and the configuration formed by urethane foam material 20.

As shown in FIGS. 4 and 5 the mold assembly 10 is repositioned so that cover member 16 is now on the bottom of the mold assembly. The tips of nails 14 have been cut off and a suitable thin flat cover rim member 27 extending around only the edge of upper mold member 13 is nailed to the upper mold member 13 as shown. The thickness of member 27 will be the thickness of the glove mold being fabricated and therefore is carefully chosen to be of a predetermined thickness. Over member 27 is then placed the lower mold member 12 having object 11 secured thereto so that the object is juxtapositioned to the surface 29 of the urethane foam material 20 which duplicates the surface 18 of object 11 as shown in FIG. 5. This mold assembly is now clamped together by, for example, C-clamps 30 and the assembly placed on its edge as shown in FIG. 6.

It will be obvious from FIG. 5 that the space 31 between object 11 and the urethane foam material 20 is the thickness of the resulting mold to be fabricated by the disclosed method.

The next step in the disclosed method is to inject suitable mold material between the matrix formed by the urethane foam material 20 and object 11. Mold material under pressure is then slowly forced into the mold assembly under pressure. As this material rises in space 31 formed between object 11 and the urethane foam material 20 in the mold assembly, the displaced air will escape through the vent holes 22. When the material begins to flow out of these vent holes they are plugged individually. When the last vent hole is plugged the mold material under pressure is disconnected from nipple 24. The hose 26 may be removed from nipple 24 and the mold laid on its side with nipple 24 extending upwardly so the mold material may be cured. After curing the mold is removed from the mold assembly and is ready for use.

It should be appreciated that if the urethane foam material 20 was replaced with another material whose chemical properties are compatible with the rubber sheet 17 the plastic material 19 will not be needed in the mold assembly.

In order to complete the description of the invention a few non-limitative examples of materials which may be used for the various elements of the above described assemblage will be cited.

As mentioned above, metal, wood, plastic, plaster or any other suitable strong material may be used for upper and lower mold members 12 and 13 as well as cover member 16 and periphery member 27.

Sheet 17 may be formed of rubber, as disclosed, or wet felt.

In place of the urethane foam material 20 other materials may be used such as plaster, with or without fibrous material, polyester which is workable when hot and sufficiently rigid when cold to fulfill the function of the urethane foam material 20 or other suitable materials having a relatively high melting temperature to resist the temperature of the aforesaid mold material.

Although but one embodiment of the present invention has been illustrated and described it will be apparent to those skilled in the art that various changes and modifications may be made therein without departing from the spirit of the invention or from the scope of the appended claims.

What is claimed is:

1. A method of fabricating a thin skin mold for an object having a distinctive surface, said method comprising the steps of:
    applying a fluid pressure differential to a deformable relatively incompressible sheet to cause it to conform closely to the surface of an object so that the outer surface of said sheet substantially duplicates said surface,
    casting on said outer surface of said sheet a settable material which will become rigid when set and will conform closely to said outer surface of said sheet,
    permitting said material to set and become rigid,
    separating said sheet and the rigid material from said object and from each other,
    reassembling said object and said rigid material so that the similar characteristics of said surface of the object and said surface of said set and rigid material are spaced from each other in juxtapositioned relationship and forming a liquid tight joint therewith,
    forming passages through said rigid material in such a way that they communicate with the space between the juxtapositioned surfaces,
    one of said passages being an injection opening and the other of said passages forming air vents,
    injecting a thermosetting mold forming material through said injection opening to fill the space between said juxtapositioned surfaces,
    blocking the other of said passages as said material starts to immerge therefrom, and
    curing said mold forming material to form a rigid mold.

2. The method of claim 1 in further combination with the step of making the space between said juxtapositioned surfaces equal to the thickness of said deformable sheet.

3. The method of claim 1 wherein said deformable sheet is of uniform thickness.

4. The method of claim 1 wherein said deformable sheet is formed from a resilient material.

5. The method of claim 1 wherein a thin sheet of pliable plastic is placed over the deformable sheet prior to casting the settable material and the settable material which will become rigid is a rigid urethane foam forming material.

6. The method of claim 1 wherein said deformable sheet is a sheet of rubber.

References Cited

UNITED STATES PATENTS

| | | | |
|---|---|---|---|
| 727,435 | 5/1903 | Pietzner | 264—219 X |
| 2,734,243 | 2/1956 | Lips et al. | 264—219 X |
| 3,428,725 | 2/1969 | Delmonte et al. | 264—226 |
| 3,548,050 | 12/1970 | Mozer | 264—220 X |
| 3,248,758 | 5/1966 | Schmitz | 264—219 X |
| 2,662,248 | 12/1953 | Ames | 264—219 |
| 2,734,243 | 2/1956 | Lips | 264—219 X |
| 3,188,370 | 6/1965 | Gotzy | 264—226 |
| 3,204,385 | 9/1965 | De Remer | 264—45 X |

FOREIGN PATENTS

| | | | |
|---|---|---|---|
| 782,980 | 7/1935 | France | 264—219 |

OTHER REFERENCES

Dow Corning Bulletin: "Greater Versatility in Design and Production With Silastic RTV," Dow Corning Corp., 1961, pp. 1–7.

PHILIP E. ANDERSON, Primary Examiner

U.S. Cl. X.R.

161—116; 249—134; 264—45, 88, 225, 328; 425—175